No. 747,300. PATENTED DEC. 15, 1903.
H. CÔTÉ.
LOOM SHUTTLE.
APPLICATION FILED MAY 28, 1903.
NO MODEL.
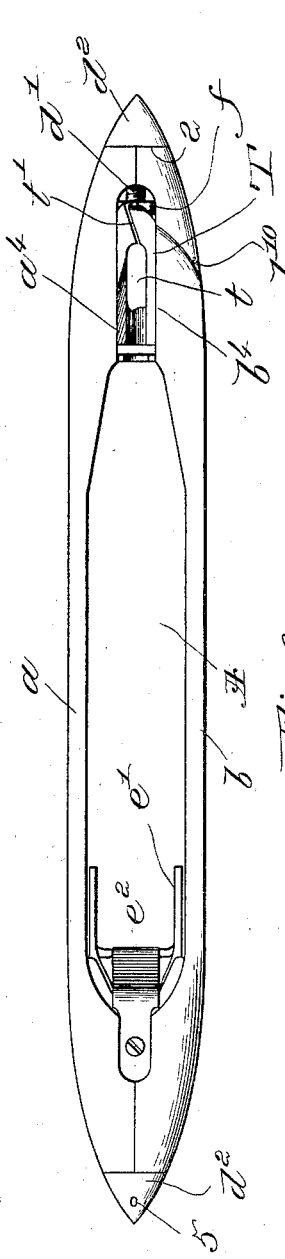
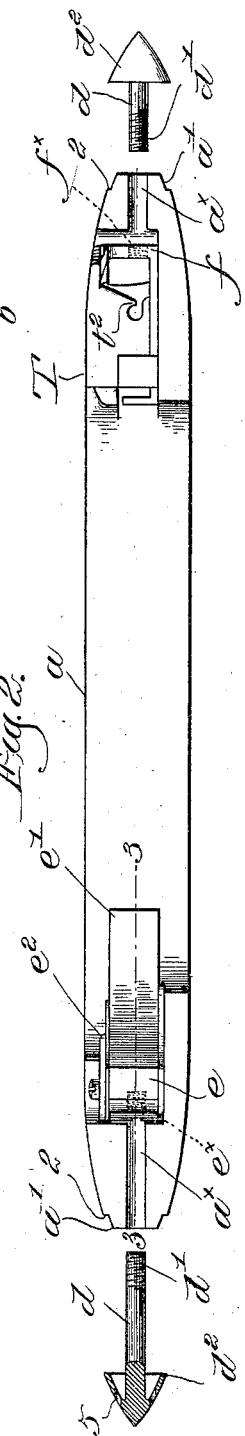
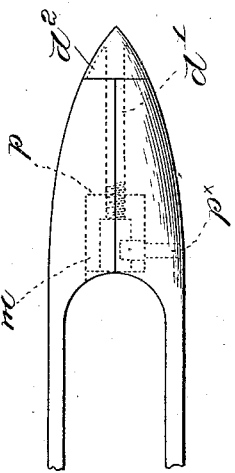
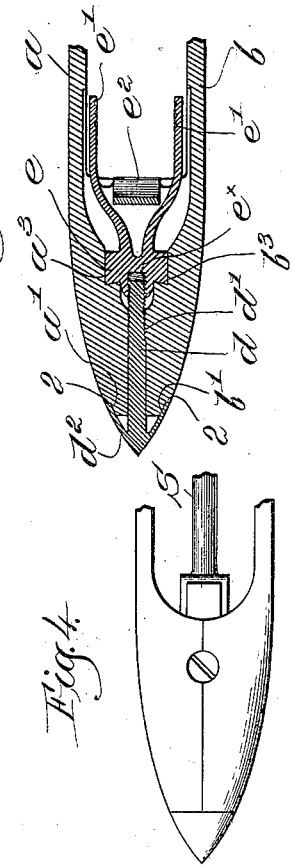
Witnesses:
Thomas J. Drummond
W. C. Lunsford
Inventor:
Henry Côté,
by Crosby Gregory
Attys.

No. 747,300. Patented December 15, 1903.

UNITED STATES PATENT OFFICE.

HENRY CÔTÉ, OF WOONSOCKET, RHODE ISLAND, ASSIGNOR TO DRAPER COMPANY, OF HOPEDALE, MASSACHUSETTS, A CORPORATION OF MAINE.

LOOM-SHUTTLE.

SPECIFICATION forming part of Letters Patent No. 747,300, dated December 15, 1903.

Application filed May 28, 1903. Serial No. 159,050. (No model.)

*To all whom it may concern:*

Be it known that I, HENRY CÔTÉ, a citizen of the United States, and a resident of Woonsocket, county of Providence, State of Rhode Island, have invented an Improvement in Loom-Shuttles, of which the following description, in connection with the accompanying drawings, is a specification, like letters on the drawings representing like parts.

This invention has for its object the production of a novel, strong, and durable loom-shuttle the body of which is made in two longitudinally-divided halves or members rigidly held together by simple and effective means.

By the construction to be hereinafter described economy in manufacture is effected, a broken side or one seriously split or splintered may be replaced without discarding the entire shuttle, and the mode of holding the separable halves together is simple and novel.

The parts are few in number, readily and cheaply made, and the assembling or separation of the several parts is easily accomplished.

The various novel features of my invention will be fully described in the subjoined specification, and particularly pointed out in the following claims.

Figure 1 is a top or plan view of a shuttle embodying one form of my invention. Fig. 2 is an inner face view of one of the halves or members, showing the anchors in place, the retaining-bolts being drawn out and one of them having its head in section. Fig. 3 is a horizontal sectional detail on the line 3 3, Fig. 2, but showing the retaining-bolt in operative position; and Figs. 4 and 5 are details in plan of the opposite ends of a shuttle embodying my invention and provided with different means for supporting the filling-carrier and delivering the thread.

In accordance with my invention the shuttle-body comprises, essentially, two substantially like halves or members $a$ and $b$, Figs. 1 and 3, which may be made of wood or other suitable material, preferably non-metallic, and divided longitudinally along the axial plane of the shuttle. The inner faces of the halves are shaped to present an opening A, Fig. 1, for the bobbin, cop, or other form of filling-carrier, and the ends are externally tapered, as at $a'$ $b'$, and blunted or frusto-conical in shape, as best shown in Fig. 2, leaving an annular shoulder 2 when the halves are assembled. Each end of each half has an axial semicircular bolt-socket formed in its abutting face, as at $a^\times$, Fig. 2, it being understood that when the halves are assembled a longitudinal cylindrical socket will be formed at each end. Similar retaining-bolts $d$, threaded at their inner ends at $d'$, are inserted loosely in these sockets, the bolts having hollow conical heads $d^2$, Figs. 2 and 3, which fit over the tapered ends of the halves $a$ and $b$, so that when the bolts are set up the heads draw the abutting faces of the halves tightly together. To facilitate setting up the bolts, the heads may have holes, as 5, Fig. 2, to receive a suitable wrench. I have provided an anchor for each bolt, and in the present embodiment of my invention one anchor is provided with means for supporting the filling-carrier, while the other anchor has attached means for effecting the delivery of the thread or yarn.

Referring to the drawings, Figs. 2 and 3, a metal block $e$ constitutes one anchor, having a threaded hole $e^\times$, Fig. 3, to receive the threaded end of its coöperating bolt, the anchor being held in sockets $a^3$ $b^3$, formed in the inner faces of the halves $a$ and $b$. Holding-jaws $e'$ are shown herein secured to or forming a part of the anchor, to grasp the head of a filling-carrier, and having a guide $e^2$, similar to the construction shown in United States Patent No. 628,772, the means for supporting the filling-carrier being adapted for use in automatic filling-replenishing looms. By substituting a spindle or skewer, however, and mounting it on the anchor it will be obvious that other forms of supporting means for the filling-carrier could be employed, and in Fig. 4 a spindle S is shown, the anchor being substantially as before described.

The screwing of the bolt into the anchor acts to hold the two halves $a$ and $b$ securely together, Figs. 1 and 3, at that end, and the anchor is held in place by the bolt seated in its socket, and lateral displacement of the anchor is prevented by the members $a$ and $b$. At the other end of the shuttle the anchor $f$, which is herein shown as secured to or forming part of a self-threading block T, has a threaded hole $f^\times$, Fig. 2, to receive the end $d'$ of its bolt, the halves of the shuttle-body being socketed on their inner faces at $a^4 b^4$, Fig. 1, to receive the block. A longitudinal thread-passage $t$ is formed therein and an entrance-slot $t'$, the thread passing beneath the heel $t^2$, Fig. 2, to the delivery-eye $b^{10}$ of the shuttle, Fig. 1. Such a self-threading block coöperates with the supporting means for the filling-carrier herein illustrated for an automatic filling-replenishing loom; but obviously other forms of thread-delivering blocks or devices may be used, secured to or forming a part of the anchor.

In Fig. 5 a tubular extension $m$ is secured to or forms a part of the anchor $p$, said extension having an opening in its side to register with the side delivery-eye $p^\times$ of the shuttle-body.

It will be understood without detailed explanation that the bolt and anchor just described hold the adjacent ends of the sides or halves securely together, the bolt-heads alternately receiving the blows of the pickers, the strain being transmitted directly to the shuttle-body through the bolt-heads. The shoulders 2 limit the inward movement of the heads $d^2$ when the bolts are set up and form a close joint thereat, the exteriors of the heads being shaped to form continuations of the outer surfaces of the halves.

My invention is not restricted to the precise construction and arrangement shown and described, as the same may be varied or modified by those skilled in the art without departing from the spirit and scope of my invention.

Having fully described my invention, what I claim as new, and desire to secure by Letters Patent, is—

1. A multipart loom-shuttle comprising two longitudinally-divided halves having externally-tapered and axially-socketed ends, a threaded retaining-bolt to loosely enter each socket and having a hollow, conical head to embrace and hold together the adjacent ends of the halves, and an anchor for and into which the inner end of each bolt is screwed, the anchors being held between the opposed halves and one of them serving to sustain a filling-carrier.

2. A multipart loom-shuttle comprising two longitudinally-divided halves having externally-tapered and axially-socketed ends, a threaded retaining-bolt to loosely enter each socket and having a hollow, conical head to embrace and hold together the adjacent ends of the halves, and an anchor for and into which the inner end of each bolt is screwed, one of said anchors serving to sustain a filling-carrier and the other anchor having a thread-delivering passage therein.

3. A multipart loom-shuttle comprising two longitudinally-divided halves having externally-tapered and axially-socketed ends, a threaded retaining-bolt to enter each socket and having a hollow, conical head to embrace and hold together the adjacent ends of the halves, a detachable anchor for and into which the inner end of each bolt is screwed, the anchors being held laterally by the opposed sides of and between the halves, one of said anchors having attached means for supporting a filling-carrier and the other anchor having a self-threading block secured to it.

In testimony whereof I have signed my name to this specification in the presence of two subscribing witnesses.

HENRY CÔTÉ.

Witnesses:
ERNEST W. WOOD,
GEORGE B. ARNOLD.